Dec. 27, 1938.    E. L. ROSE    2,141,935
POWER TRANSMISSION
Filed Nov. 17, 1936    5 Sheets-Sheet 1

INVENTOR
EDWIN L. ROSE
BY
Ralph L. Tweedale
ATTORNEY

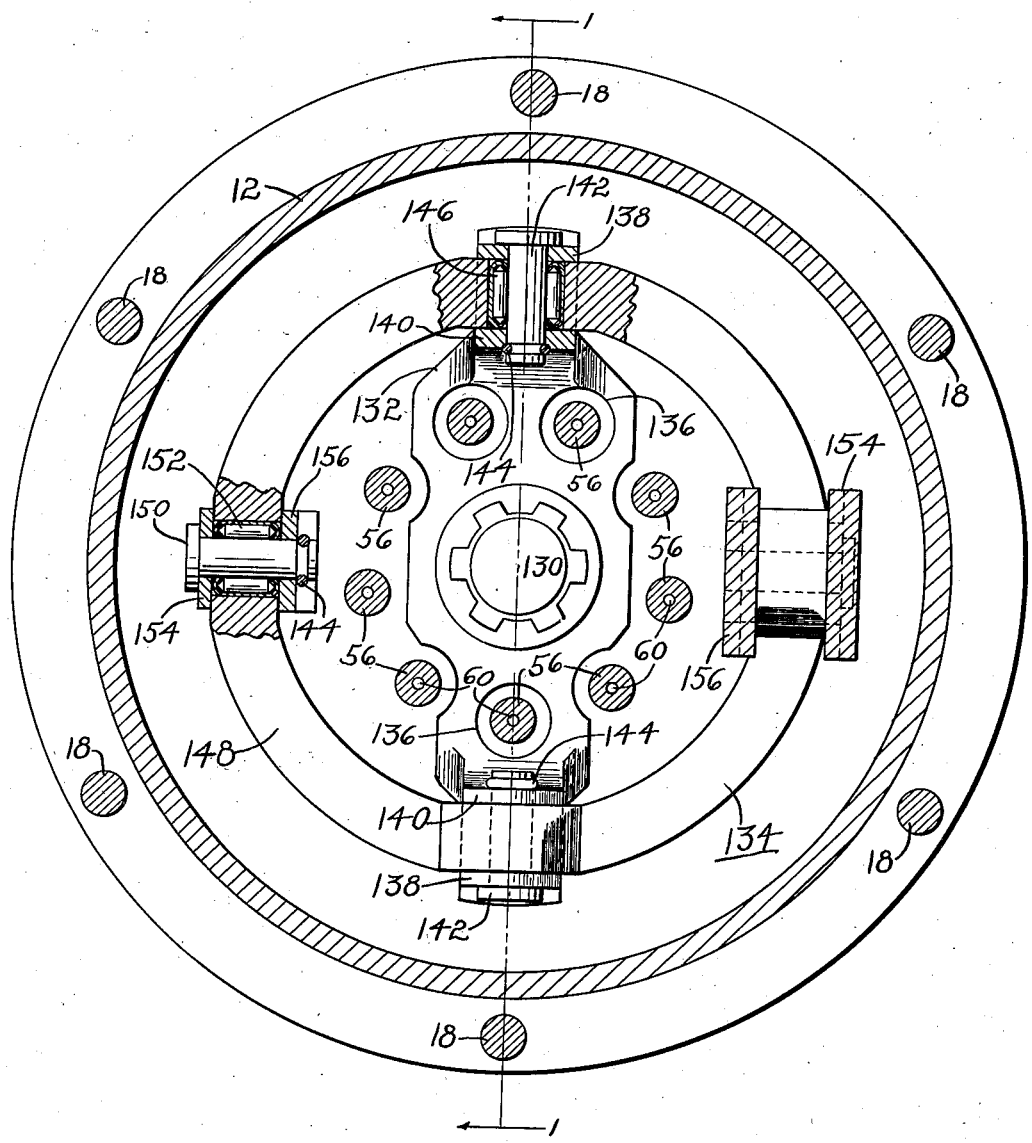

Dec. 27, 1938.　　　　E. L. ROSE　　　　2,141,935
POWER TRANSMISSION
Filed Nov. 17, 1936　　　　5 Sheets-Sheet 3
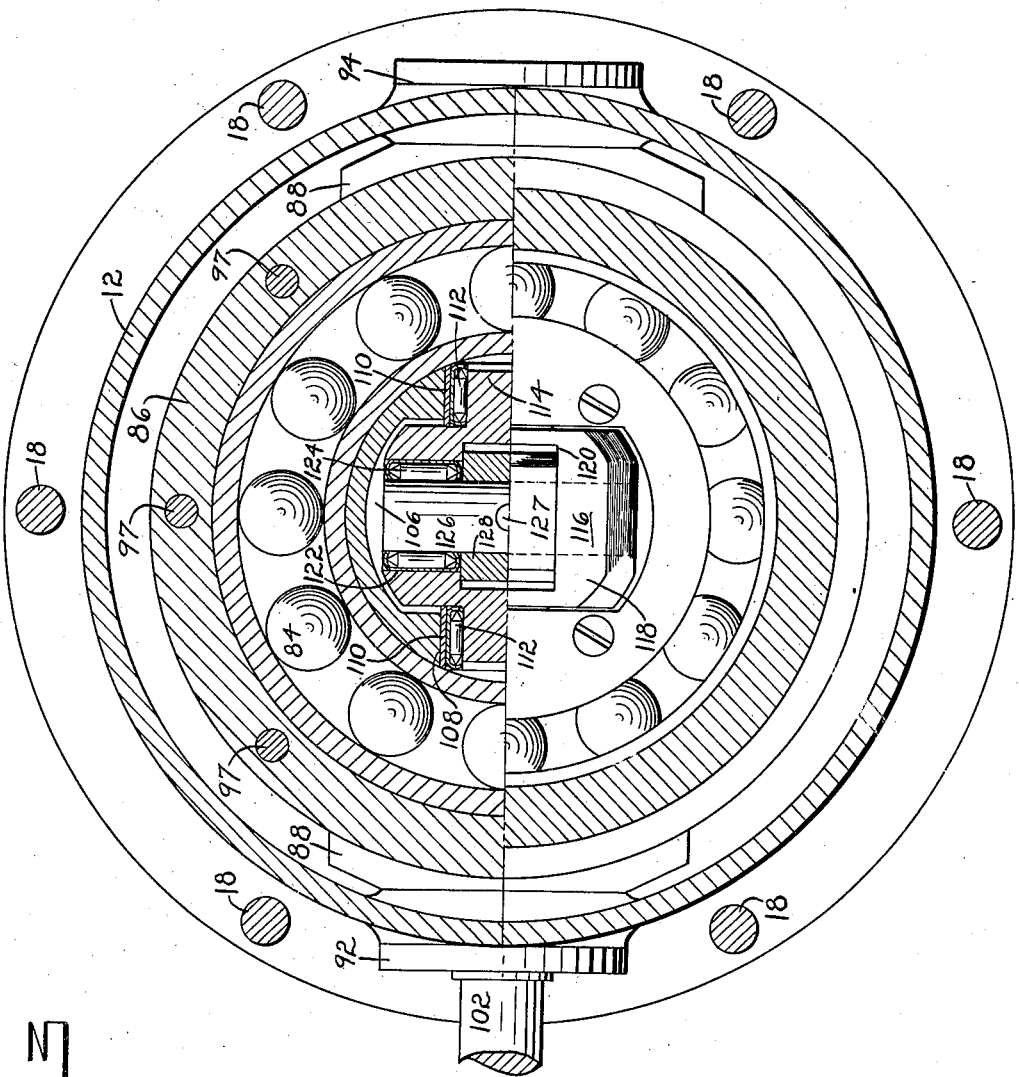
INVENTOR
EDWIN L. ROSE
BY
Ralph L. Tweedale
ATTORNEY

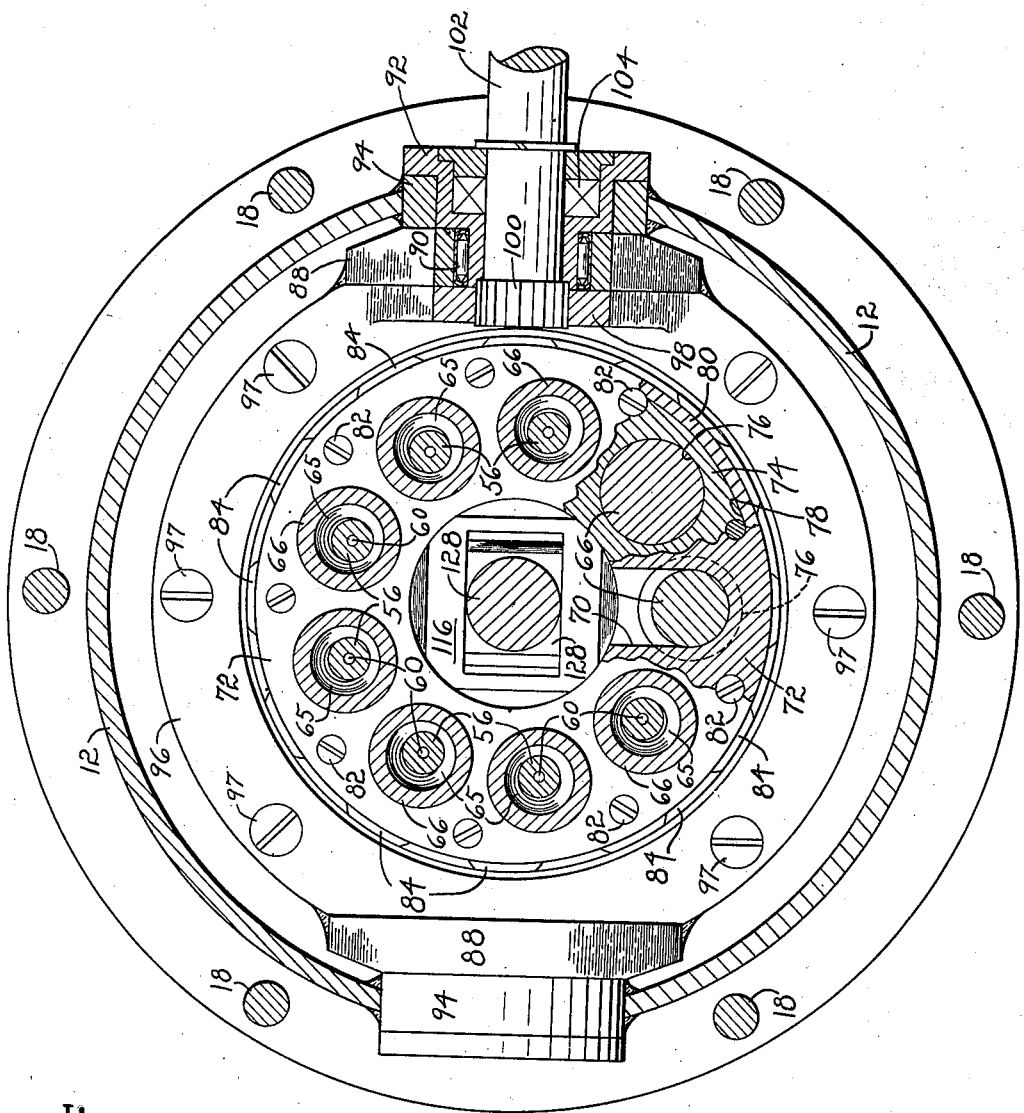

Dec. 27, 1938.   E. L. ROSE   2,141,935
POWER TRANSMISSION
Filed Nov. 17, 1936   5 Sheets-Sheet 5
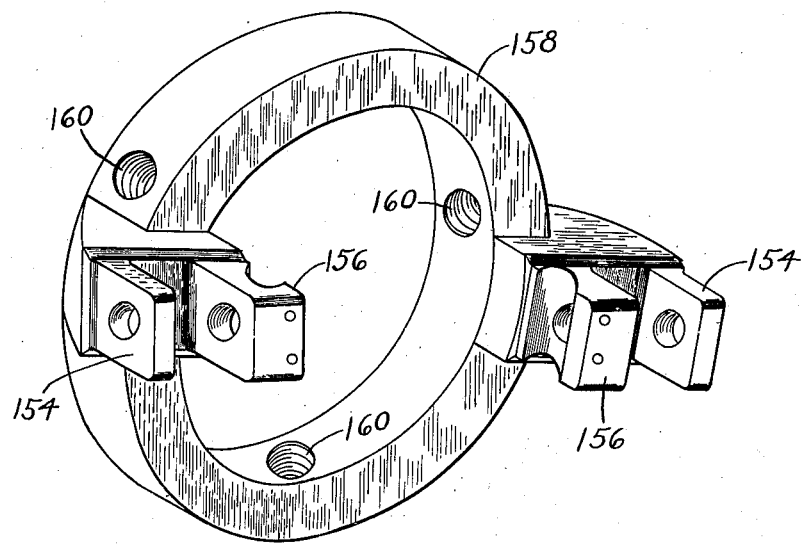
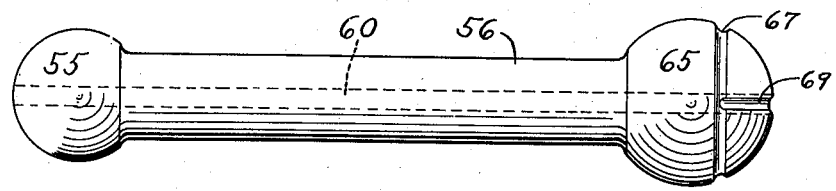
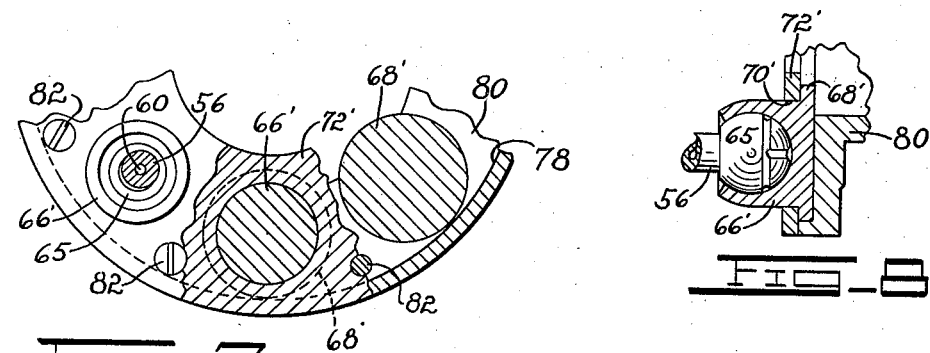
INVENTOR
EDWIN L. ROSE
BY
ATTORNEY Patented Dec. 27, 1938

2,141,935

UNITED STATES PATENT OFFICE 2,141,935

POWER TRANSMISSION

Edwin L. Rose, Watertown, Conn., assignor to The Waterbury Tool Company, Waterbury, Conn., a corporation of Connecticut Application November 17, 1936, Serial No. 111,240

5 Claims. (Cl. 103—162)

This invention relates to power transmissions and particularly to those of the type comprising one or more fluid pressure energy translating devices, one of which may function as a pump and another as a motor. The invention is particularly concerned with the construction of a fluid pressure energy translating device of the type comprising a revolving cylinder barrel with axial bores and having an inclined swash plate for causing reciprocation of suitable pistons within the bores.

It is an object of the present invention to provide a fluid pressure energy translating device of this character which is suitable for operation at high fluid pressures with high efficiency and long life.

A further object is to provide a device of this character incorporating a novel double universal joint construction of compact form whereby variations in the velocity between the cylinder barrel and the socket ring are eliminated.

A further object is to provide in a device of this character a novel piston, connecting rod, and socket ring construction of simple design permitting economical manufacture and ready replacement of those parts as a unit when they become worn.

Further objects and advantages of the present invention will be apparent from the following description, reference being had to the accompanying drawings wherein a preferred form of the present invention is clearly shown.

In the drawings:

Fig. 2 is a cross section on line 2—2 of Fig. 1.

Fig. 3 is a cross section on line 3—3 of Fig. 1.

Fig. 4 is a cross section on line 4—4 of Fig. 1.

Fig. 5 is a perspective view of a portion of one of the universal joints of the mechanism.

Fig. 6 is a side view of a connecting rod.

Fig. 7 is a fragmentary view corresponding to Fig. 4 showing a modified form of the present invention.

Fig. 8 is a fragmentary view corresponding to Fig. 1 showing a modified form of the present invention.

Figure 1:
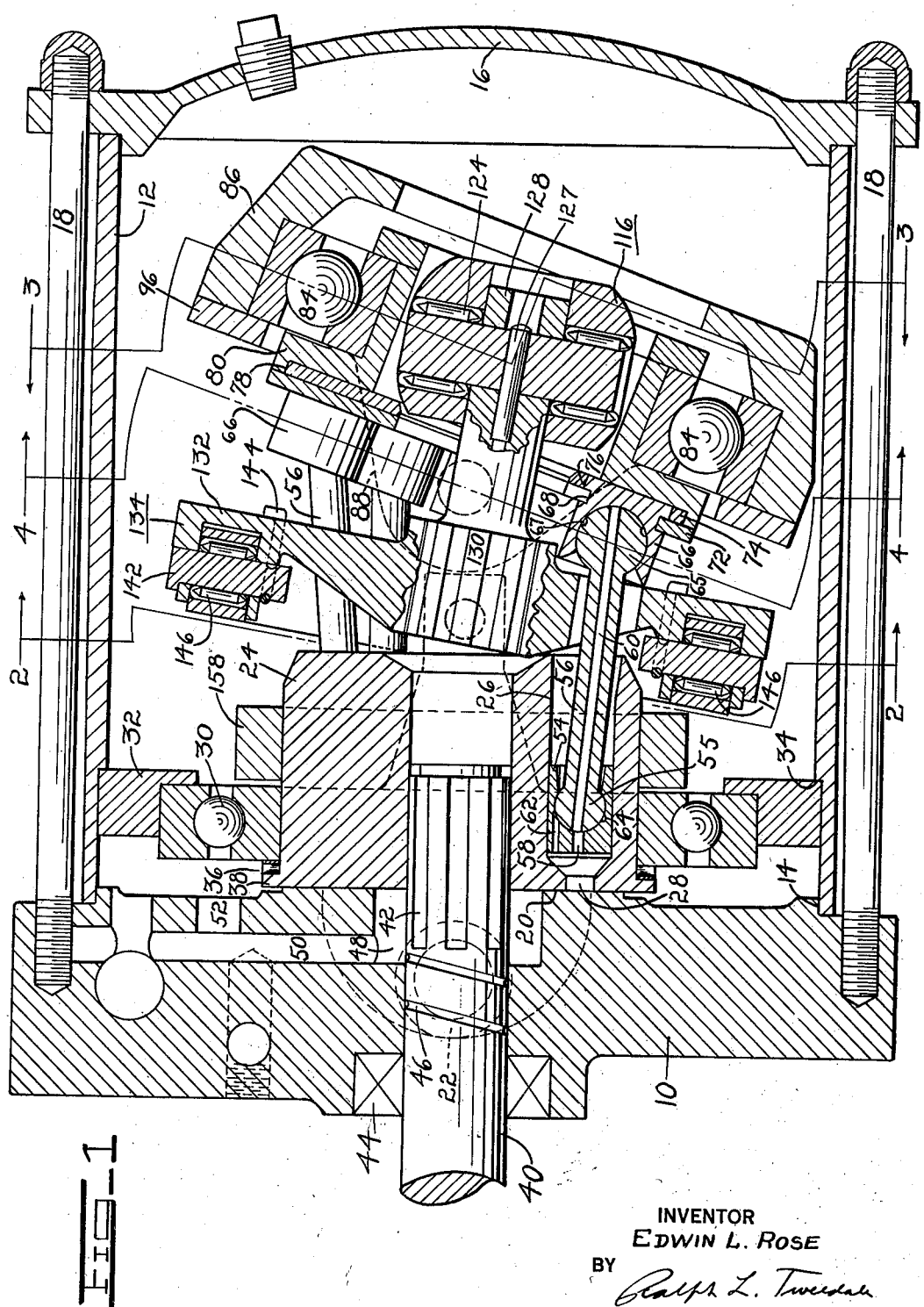
Fig. 1 is a longitudinal cross section of a fluid pressure energy translating device incorporating a prefered form of the present invention.

The device illustrated in the drawings comprises a fluid pressure energy translating device, the displacement of which may be varied while in operation and which may function either as a pump or a motor.

In Fig. 1 there is illustrated a casing comprising a valve plate 10 against which is secured a tubular casing member 12 resting in a shouldered seat 14. The opposite end of the casing member 12 is closed by an end plate 16, the parts being secured together by through bolts 18 suitably spaced around the circumference of the device. The valve plate 10 has a raised annular pressure surface 20 provided with a pair of arcuate inlet and outlet ports 22 of customary shape as used in devices of this character. Against the surface 20 a cylinder barrel 24 abuts and is provided with a plurality of cylinder bores 26 having cylinder ports 28 adapted to alternately register with each of the ports 22 in the valve plate 10. The cylinder barrel 24 is positioned radially by an anti-friction bearing 30 which is mounted in a shouldered ring 32 seated against a shoulder 34 formed in the interior of the tubular casing member 12. The inner race of the bearing 30 is in sliding contact with the outer surface of the cylinder barrel 24 and abuts against a corrugated annular spring 36 which in turn abuts against a flange 38 formed on the cylinder barrel 24 and exerts a small force tending to maintain the cylinder barrel 24 in contact with the pressure surface 20.

The cylinder barrel 24 is drivingly connected to a shaft 40 by a splined connection 42. The shaft 40 may preferably be one end of the shaft of a prime mover, such as an electric motor, when the device is intended to function as a pump, the valve plate 10 for this purpose being secured to or formed integrally with one end plate of the prime mover. A suitable oil seal 44 and screw pump 46 are provided for preventing the travel of oil along the shaft 40. A chamber 48 inside the pressure surface 20 communicates by passages 50 and 52 with the interior of the casing. The valve plate 10 also may be provided with suitable replenishing and relief valves, not shown, of any well-known construction.

Each of the cylinder bores 26 carries reciprocably mounted therein a piston 54 which is swaged or spun on to the ball end 55 of a connecting rod 56 over a solid angle greater than $2\pi$ steradians to form an integral, articulated ball joint. The piston 54 has a central passage 58 communicating with a longitudinal passage 60 running through the connecting rod 56. A small hole 62 also communicates with an annular groove 64 formed in the socket surface of the piston 54 to distribute high pressure fluid over the loaded portion of the ball joint bearing. At the opposite end the connecting rod 56 has another and larger ball 65 which is embraced by a socket member 66 which is also swaged or spun over a solid angle greater than 2π steradians to form another integral, articulated ball joint. An annular groove 67 is formed on the ball 65 at the diameter equal to the diameter of the piston 54. Other grooves 69 (Fig. 6) connect the groove 67 with passage 60 whereby the full working pressure is distributed over a projected area equal to the piston area. The arc of contact between ball 65 and socket 66 to the left of groove 67 is preferably proportioned with regard to the pressure drop in the oil film and the projected area so as to exert no resultant force on the socket and ball. The ball joint is thus completely balanced hydraulically so that friction and wear are negligible.

The socket member 66 has a groove 68 around its circumference near the other end thereof which is engaged in a slot 70 (see Fig. 4) of a plate 72. A second plate 74 is provided with perforations 76 in which the bases of the socket members 66 rest. The plate 74 is positioned in a recess 78 formed in a socket ring 80 while the plate 72 is secured on the face of the socket ring 80 and on top of the plate 74 by suitable fastening means 82. The socket ring 80 is journalled on an anti-friction bearing 84 of the combined radial and thrust type which is mounted in a tilting box 86.

The tilting box 86 is provided with arms 88 on opposite sides thereof which are journalled by needle bearings 90 (see Fig. 4) on the trunnion members 92 removably secured in annular bosses 94 on opposite sides of the casing member 12. The bearing 84 is retained in the tilting box by a plate 96 secured to the tilting box by screws 97 and having at one side an upstanding arm 98 which is splined at 100 to a control shaft 102. The latter is journalled in the trunnion 92 and is surrounded by an oil seal 104 for preventing escape of oil from the casing. The shaft 102 may be operated by any suitable manual or automatic control mechanism to vary the inclination of the tilting box 86 relative to the plane of the valve plate 10.

The socket ring 80 is formed with an interior opening 106 (see Fig. 3) having longitudinal slots 108 on either side thereof within which rectangular blocks 110 may be mounted. The blocks 110 carry needle bearings 112 in which are journalled the trunnions 114 forming part of a universal joint indicated generally at 116. The trunnions 114 are formed on a block 118 having a longitudinal, rectangular slot 120 formed therethrough, together with a transverse bore 122. Within the bore 122 there is journalled on needle bearings 124, a pin 126 which is secured by a pin 127 (Fig. 1) in a shaft member 128 having a rectangular cross section and fitting within the rectangular opening 120.

The shaft 128 extends forward to terminate in a splined section 130 to which is secured a spider member 132 forming part of a second universal joint indicated generally at 134. The spider member 132 (see Fig. 2) is provided with clearance bolts 136 arranged to permit passage of the connecting rods 56 with the assembled pistons 54 thereon and to avoid interference with any of the connecting rods 56 in any position of the parts of the mechanism. The spider 132 carries at its outer extremities a pair of bifurcated arms 138 and 140 between which trunnion pins 142 extend and are retained by U-shaped wire retainers 144. Journalled on the trunnion pins 142 by needle bearings 146 is a ring 148 surrounding the connecting rods 56.

At points 90° away from the trunnion pins 142, the ring 148 is trunnioned on similar trunnion pins 150 by needle bearings 152 and bifurcated arms 154 and 156 of a ring member 158 (see Fig. 5). The ring 158 is secured to the cylinder barrel 24 by suitable fastening means engaging the holes 160 in the ring 158. It will be seen that the socket ring is thus drivingly connected to the cylinder barrel 24 and shaft 40 through the medium of the universal joints 134 and 116. The geometrical centers of action of the joints 116 and 134 are preferably situated equidistant from, and on opposite sides of, the axis of the tilting box trunnion bearings 90. The latter are preferably positioned in the plane of the ball and socket joints 66.

In operation assuming the device to be operated as a fluid pump, the shaft 40 is rotated from a suitable prime mover and the valve ports 22 are connected by supply and return conduits to any desired load device. It will be seen that with the tilting box 86 adjusted to a neutral position, that is with its plane parallel to the plane of the valve plate 10, the cylinder barrel 24 and the socket ring 80 will be rotated in unison and in parallel planes, the pistons 54 partaking of no reciprocating movement in the cylinder bores 26. If the tilting box 86 be pivoted to a position such as that illustrated in Fig. 1, the socket ring 80 is caused to revolve in a plane inclined to the plane of the valve plate 10 so that during one-half of the revolution a given piston is moved inwardly toward the valve plate 10, and during the other half the piston is moved outwardly. Fluid is thereby forced into the delivery port 22 as the piston moves inwardly and withdrawn from the suction port 22 as the piston moves outwardly. The port 28 of each cylinder passes from the suction port to the delivery port and vice versa as the piston goes through dead center position at the top and bottom in Fig. 1 respectively. Inasmuch as the trunnion pins 142 of the joint 134 and the trunnion pin 126 of the joint 116 are located in a common plane, it will be seen that the variations in angular velocity produced by each joint are cancelled out by the opposite variations produced in the other joint. Due to the equidistant spacing of the two joints from the tilting box trunnion axis, the axis of shaft 128 makes equal angles with the axis of the cylinder barrel 24 and with the axis of the socket ring 80.

It will be noted that the pistons 54, connecting rods 56, and socket members 66, each form a unitary sub-assembly which may be readily replaced by removing the plate 72 whenever the pistons 54 and the ball and socket joints become worn. The pistons 54 and the socket member 66 are preferably formed of a softer material than the cylinder barrel 24 and the connecting rods 56. Thus, the pistons and socket members may be formed from a beryllium-copper alloy hardened after assembly to the connecting rod, while the cylinder barrel and connecting rods may be formed of hardened steel. Thus, after the machine has been in use so long as to have produced excessive wear in the piston diameter or in the ball and sockets, or both, the piston, connecting rod and socket member assemblies may be readily replaced, to provide an additional long period of useful life.

In Figs. 7 and 8 there is illustrated a modified construction for the socket member at the ball 65 and for its attachment to the socket ring 80. In this form of the invention the socket member 66' is formed with a shoulder 68' at its base which abuts against the socket ring 80. The sockets 66 are inserted through perforations 70' formed in a plate 72'. The plate 72' is secured to the socket ring in the same manner as the plate 72 and serves to provide both lateral and longitudinal positioning of the socket member 66' on the socket ring 80.

While the form of embodiment of the invention as herein disclosed, constitutes a preferred form, it is to be understood that other forms might be adopted, all coming within the scope of the claims which follow.

What is claimed is as follows:

1. In a fluid pressure energy translating device the combination of a rotatable cylinder barrel having a plurality of bores spaced around the axis of rotation of the barrel and having cylinder ports in one end face, a valve plate having a plane face coacting with said end face and containing arcuate inlet and outlet ports coacting with the cylinder barrel and connecting rods may be connecting rods each having one end articulated to one of said pistons, a socket ring to which the other end of each connecting rod is articulated, means mounting the socket ring for rotation about an axis inclined to the axis of barrel rotation, a first universal joint surrounding the connecting rods and connected to rotate with the cylinder barrel, a second universal joint inside and connected to the socket ring, and means including a spider member extending between the connecting rods and connecting said universal joints.

2. In a fluid pressure energy translating device the combination of a rotatable cylinder barrel having a plurality of bores spaced around the axis of rotation of the barrel and having cylinder ports in one end face, a valve plate having a plane face coacting with said end face and containing arcuate inlet and outlet ports coacting with the cylinder ports, pistons reciprocable in said bores, connecting rods each having one end articulated to one of said pistons, a socket ring to which the other end of each connecting rod is articulated, means mounting the socket ring for rotation about an axis inclined to the axis of barrel rotation, a first universal joint surrounding the connecting rods and connected to rotate with the cylinder barrel, a second universal joint inside and connected to the socket ring and means including a spider member extending between the connecting rods and connecting said universal joints, said universal joints having their centers equidistant from and on opposite sides of the point of intersection of the barrel axis with the socket ring axis.

3. In a fluid pressure energy translating device of the barrel and swash plate type the sub-combination comprising a connecting rod having ball ends, a one-piece combined piston and ball socket comprising a cylindrical block having a socket surrounding one ball over a solid angle greater than $2\pi$ steradians, a one-piece ball socket comprising a block having a socket surrounding the other ball over a solid angle greater than $2\pi$ steradians and means for providing a hydraulic balance in said ball socket.

4. In a fluid pressure energy translating device the combination of a rotatable cylinder barrel having a plurality of bores spaced around the axis of rotation of the barrel and having cylinder ports in one end face, a valve plate having a plane face coacting with said end face and containing arcuate inlet and outlet ports coacting with the cylinder ports, pistons reciprocable in said bores, connecting rods each having one end articulated to one of said pistons, a socket ring to which the other end of each connecting rod is articulated, means mounting the socket ring for rotation about an axis inclined to the axis of barrel rotation, means for causing the socket ring and cylinder barrel to rotate in unison, said socket ring including an individual socket member for each connecting rod removably secured to the socket ring and permanently secured to the connecting rod, said socket ring also including a plate having recesses for laterally positioning said individual socket members, and a second plate having open-ended slots engageable with said socket members to longitudinally position them on the socket ring, said plates being removably secured to said socket ring.

5. In a fluid pressure energy translating device the combination of a rotatable cylinder barrel having a plurality of bores spaced around the axis of rotation of the barrel and having cylinder ports in one end face, a valve plate having a plane face coacting with said end face and containing arcuate inlet and outlet ports coacting with the cylinder ports, pistons reciprocable in said bores, connecting rods each having one end articulated to one of said pistons, a socket ring to which the other end of each connecting rod is articulated, means mounting the socket ring for rotation about an axis inclined to the axis of barrel rotation, means for causing the socket ring and cylinder barrel to rotate in unison, said socket ring including an individual socket member for each connecting rod removably secured to the socket ring and permanently secured to the connecting rod, a flange on the end of each socket member, and a perforated plate secured to said socket ring and having the socket members extending through the perforations thereof with the flanges retained between the plate and the socket ring.

EDWIN L. ROSE.

CERTIFICATE OF CORRECTION.

Patent No. 2,141,935. December 27, 1938.

EDWIN L. ROSE.

It is hereby certified that error appears in the printed specification of the above numbered patent requiring correction as follows: Page 3, first column, line 21, claim 1, strike out "barrel and connecting rods may be" and insert instead the words and comma ports, pistons reciprocable in said bores,; and that the said Letters Patent should be read with this correction therein that the same may conform to the record of the case in the Patent Office.

Signed and sealed this 7th day of March, A. D. 1939.

Henry Van Arsdale.

(Seal) Acting Commissioner of Patents.